US006976153B1

(12) United States Patent
Oliver et al.

(10) Patent No.: US 6,976,153 B1
(45) Date of Patent: Dec. 13, 2005

(54) FLOATING POINT UNIT WITH TRY-AGAIN RESERVATION STATION AND METHOD OF OPERATION

(75) Inventors: David S. Oliver, Longmont, CO (US); Willard S. Briggs, Boulder, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 484 days.

(21) Appl. No.: 10/254,022

(22) Filed: Sep. 24, 2002

(51) Int. Cl.[7] ............................................. G06F 9/38
(52) U.S. Cl. ..................................... 712/217; 712/222
(58) Field of Search ............................... 712/217, 222

(56) References Cited

U.S. PATENT DOCUMENTS

| | | | | |
|---|---|---|---|---|
| 4,991,130 A | * | 2/1991 | Kojima ....................... 708/205 |
| 5,134,693 A | * | 7/1992 | Saini .......................... 712/244 |
| 6,112,296 A | * | 8/2000 | Witt et al. ................... 712/222 |
| 6,122,721 A | * | 9/2000 | Goddard et al. ............... 712/23 |
| 6,487,653 B1 | * | 11/2002 | Oberman et al. ........... 712/222 |
| 6,714,957 B1 | * | 3/2004 | Lohman ...................... 708/498 |
| 6,732,134 B1 | * | 5/2004 | Rosenberg et al. ......... 708/495 |
| 6,801,924 B1 | * | 10/2004 | Green et al. ................ 708/495 |
| 6,826,704 B1 | * | 11/2004 | Pickett ........................ 713/320 |

* cited by examiner

Primary Examiner—Eric Coleman

(57) ABSTRACT

A floating point unit comprising: 1) an execution pipeline comprising a plurality of execution stages for executing floating point operations in a series of sequential steps; and 2) a try-again reservation station for storing a plurality of instructions to be loaded into the execution pipeline. Detection of a denormal result in the execution pipeline causes the execution pipeline to store the denormal result in a register array associated with the floating point unit and causes the execution pipeline to store a denormal result instruction in the try-again reservation station. The try-again reservation station subsequently re-loads the denormal result instruction into the execution pipeline and the de-normal result instruction retrieves the denormal result from the register array for additional processing.

19 Claims, 4 Drawing Sheets

FLOATING POINT UNIT WITH TRY-AGAIN RESERVATION STATION AND METHOD OF OPERATION

CROSS-REFERENCE TO RELATED APPLICATION

The present invention is related to that disclosed and claimed in the following U.S. patent application Ser. No. 10/254,084, filed concurrently herewith, entitled "FLOATING POINT UNIT WITH VARIABLE SPEED EXECUTION PIPELINE AND METHOD OF OPERATION." The related application is commonly assigned to the assignee of the present invention. The disclosure of the related patent application is hereby incorporated by reference for all purposes as if fully set forth herein.

TECHNICAL FIELD OF THE INVENTION

The present invention is generally directed to data processors, and more specifically, to a try-again reservation station for use in the floating point unit (FPU) of data processor.

BACKGROUND OF THE INVENTION

The demand for ever-faster computers requires that state-of-the-art microprocessors execute instructions in the minimum amount of time. Microprocessor speeds have been increased in a number of different ways, including increasing the speed of the clock that drives the processor, reducing the number of clock cycles required to perform a given instruction, implementing pipeline architectures, and increasing the efficiency at which internal operations are performed. This last approach usually involves reducing the number of steps required to perform an internal operation.

Efficiency is particularly important in mathematical calculations, particularly floating point calculations that are performed by a data coprocessor. The relative throughput of a processor (i.e., integer unit pipeline) that drives a coprocessor (i.e., floating point unit pipeline) may change drastically depending on the program being executed.

In floating point representation, every number may be represented by a significand (or mantissa) field, a sign bit, and an exponent field. Although the size of these fields may vary, the ANSI/IEEE standard 754-1985 (IEEE-754) defines the most commonly used floating point notation and forms the basis for floating point units (FPUs) in x86 type processors. The IEEE-754 standard includes a signal precision format, a single extended precision format, a double precision format, and a double extended precision format. Single precision format comprises 32 bits: a sign bit, 8 exponent bits, and 23 significand bits. Single extended precision format comprises 44 bits: a sign bit, 11 exponent bits, and 32 significand bits. Double precision format comprises 64 bits: a sign bit, 11 exponent bits, and 52 significand bits. Double extended precision format comprises 80 bits: a sign bit, 15 exponent bits, and 64 significand bits.

It can be advantageous in a load-store implementation of IEEE-754 to represent all numeric values contained in the register files in the floating point unit as properly rounded values. Complete implementations of the IEEE-754 floating-point standard must perform rounding and status generation for all possible results, including tiny (denormal) results. The base number for IEEE floating-point standards is understood to be binary. A "normal" floating-point number is one which begins with the first non-zero digit in front of the binary "decimal" point and a denormal number is one that begins with the first non-zero digit after the decimal point. The accuracy or precision of the number is determined by the number of digits after the decimal point.

Data processors typically manipulate numbers in binary format. When operating in floating-point binary format, a microprocessor expects a normal floating-point binary number. As noted above, the normal floating-point binary number in the IEEE-754 format is understood to have an exponent greater than zero, a mantissa that begins with a 1, followed by the binary point, followed by subsequent binary ones (1s) and zeroes (0s). Thus, the characterization of the mathematical result as denormal (i.e., very tiny) is a function of the exponent being zero (0) and the mantissa begining with a 0, followed by subsequent binary ones (1s) and zeros (0s).

Unfortunately, denormal results may cause unique problems in a pipelined floating point unit (FPU). A conventional FPU execution pipeline typically comprises an operand stage, which retrieves operands from the register files of a register array and receives FPU opcodes from a dispatch unit. The FPU execution pipeline typically also comprises an exponent align stage, a multiply stage, an add stage, a normalize stage, and a round stage. The last stage of a conventional FPU execution pipeline is typically a write-back stage that writes results back to the register files in the register array or to a data cache.

In most applications, denormal results occur very rarely. Conventional (i.e., prior art) data processors frequently handle denormal results using microcode or software exceptions. However, in a pipelined floating point unit (FPU), no assumptions are made about the frequency of denormal results. Thus, every instruction that enters the FPU pipeline is operated on by every FPU stage. This includes the round stage after the normalize stage. Performing a conventional rounding operation on a denormal number gives an erroneous result.

One way to correct this problem would be to halt and flush out the entire execution pipeline, reload the instruction that caused the denormal result a second time, and disable the normalize stage the second time the instruction goes through. The other flushed instructions are then reloaded and processing continues. This approach greatly reduces performance, especially if a particular application generates an abnormally large number of denormal results.

Another way to correct this problem would be add an additional hardware stage to correct the error caused by the round stage, or to disable the round stage when a denormal result is detected in the normalize stage. This approach also reduces performance because every instruction must be processed by the additional stage, even though the vast majority of instructions in most applications do not produce denormal results. This approach also increases the size and power consumption of the FPU execution pipeline.

Thus, the processing of tiny numbers introduces delays in the associated pipelines and may even require additional stages and chip area to accommodate the tiny result processing requirements. In effect, all additions and multiplications are penalized by handling frequent tiny results.

Therefore, there is a need in the art for improved microprocessor architectures capable of handling denormal results more efficiently. In particular, there is a need for improved microprocessor architectures containing pipelined floating point units that are capable of handling denormal results efficiently without requiring complex rounding units in each pipeline to handle the rounding of denormal numbers.

SUMMARY OF THE INVENTION

To address the above-discussed deficiencies of the prior art, it is a primary object of the present invention to provide an improved floating point unit for use in a data processor. According to an advantageous embodiment of the present invention, the floating point unit comprises: 1) an execution pipeline comprising a plurality of execution stages capable of executing floating point operations in a series of sequential steps; and 2) a try-again reservation station capable of storing a plurality of instructions to be loaded into the execution pipeline, where detection of a denormal result in the execution pipeline causes the execution pipeline to store the denormal result in a register array associated with the floating point unit and causes the execution pipeline to store a denormal result instruction in the try-again reservation station.

According to one embodiment of the present invention, the try-again reservation station subsequently loads the denormal result instruction into the execution pipeline.

According to another embodiment of the present invention, the denormal result instruction causes the execution pipeline to retrieve the denormal result from the register array.

According to still another embodiment of the present invention, the denormal result instruction causes the execution pipeline to complete processing of the retrieved denormal result.

According to yet another embodiment of the present invention, the execution pipeline completes processing of the retrieved denormal result using circuitry in a multiply stage of the execution pipeline.

According to a further embodiment of the present invention, the execution pipeline completes processing of the retrieved denormal result using circuitry in an add stage of the execution pipeline.

According to a still further embodiment of the present invention, the detection of the denormal result in the execution pipeline causes the execution pipeline to disable a round stage in the execution pipeline so that the denormal result is stored in the register array without rounding.

According to a yet further embodiment of the present invention, a writeback stage of the execution pipeline stores the denormal result instruction in the try-again reservation station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

Figure 1:
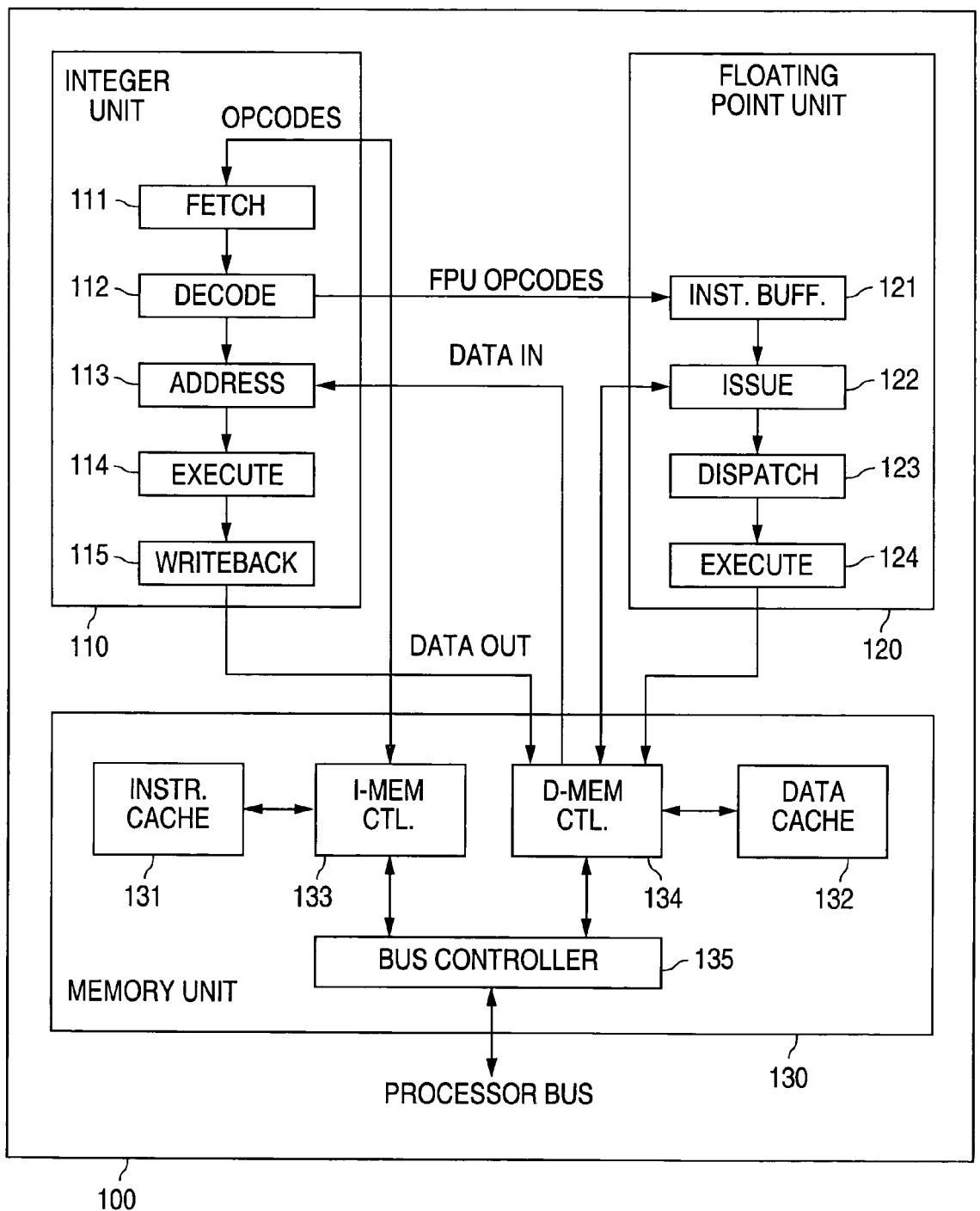
FIG. 1 illustrates an exemplary data processor in which a floating point unit according to the principles of the present invention is implemented.

FIG. 1 illustrates exemplary data processor 100 in which floating point unit 120 according to the principles of the present invention is implemented. Data processor 100 comprises integer unit (IU) 110, floating point unit (FPU) 120, and memory unit (MU) 130. Integer unit 110 comprises instruction fetch unit 111, instruction decode unit 112, address translation unit 113, integer execution pipeline 114, and writeback unit 115. Floating point unit (FPU) 120 comprises instruction buffer 121, issue unit 122, dispatch unit 123, and floating point unit (FPU) execution pipeline 124. Memory unit 130 comprises instruction cache 131, data cache 132, instruction memory controller 133, data memory controller 134, and bus controller 135.

Instruction memory controller 133 fetches instructions from instruction cache (I-cache) 131. In case of a miss in instruction cache 131, instruction memory controller 133 retrieves the missed instruction from main memory (not shown) via bus controller 125 and the processor bus (not shown). Instruction memory controller 133 then stores the retrieved instruction in instruction cache 131. Similarly, data memory controller 134 fetches data operands (DATA IN) from data cache (D-cache) 132. In case of a miss in data cache 132, data memory controller 134 retrieves the missed data operand from main memory (not shown) via bus controller 125 and the processor bus (not shown). Data memory controller 134 then stores the retrieved data in data cache 132.

During routine operation, instruction memory controller 133 fetches instructions from instruction cache 131 and loads the instructions (i.e., opcodes) into fetch unit 111 in integer unit 110. Fetch unit 111 forwards the fetched opcodes to instruction decode unit 112 for decoding. Decoding unit 112 forwards decoded integer instruction opcodes to address translation unit 113 in integer unit 110. Address translation unit 113 calculates the correct address of the data operand and retrieves the required operand from data cache 132 via data memory controller 134.

Address translation unit 113 then forwards the integer instruction opcodes and the data operands to integer execution pipeline 114. After execution of the integer instruction by integer execution pipeline 114, writeback unit 115 writes the result to an internal register array (not shown) of integer unit 110, or to data cache 132 (via data memory controller 134), or to both.

Decoding unit 112 forwards decoded floating point unit instructions (i.e., FPU opcodes) to instruction buffer 121 in floating point unit 120. Issue unit 122 reads the decoded FPU opcodes from instruction buffer 121 and retrieves the required operand from data cache 132 via data memory controller 134. Issue unit 122 then forwards the FPU instruction opcodes and the data operands to dispatch unit 123.

Dispatch unit 123 stores the opcodes and operands in a plurality of reservation stations (not shown) and subsequently transfers opcodes and operands to FPU execution pipeline 124 at appropriate times. After execution of the FPU opcodes by FPU execution pipeline 124, a writeback unit (not shown) in FPU execution pipeline 124 writes the result to an internal register array (not shown) of floating point unit 120, or to data cache 132 (via data memory controller 134).

The architecture of data processor 100 illustrated and described above with respect to FIG. 1 is well known to those skilled in the art. It should be noted that this conventional architecture is merely illustrative of one type of data processor in which a FPU according to the principles of the present invention may be embodied. Those skilled in the art will readily understand that a FPU according to the principles of the present invention may easily be implemented in many other types of data processor architectures. Therefore, the descriptions of the FPU contained herein should not be construed so as to limit the scope of the present invention.

Figure 2:
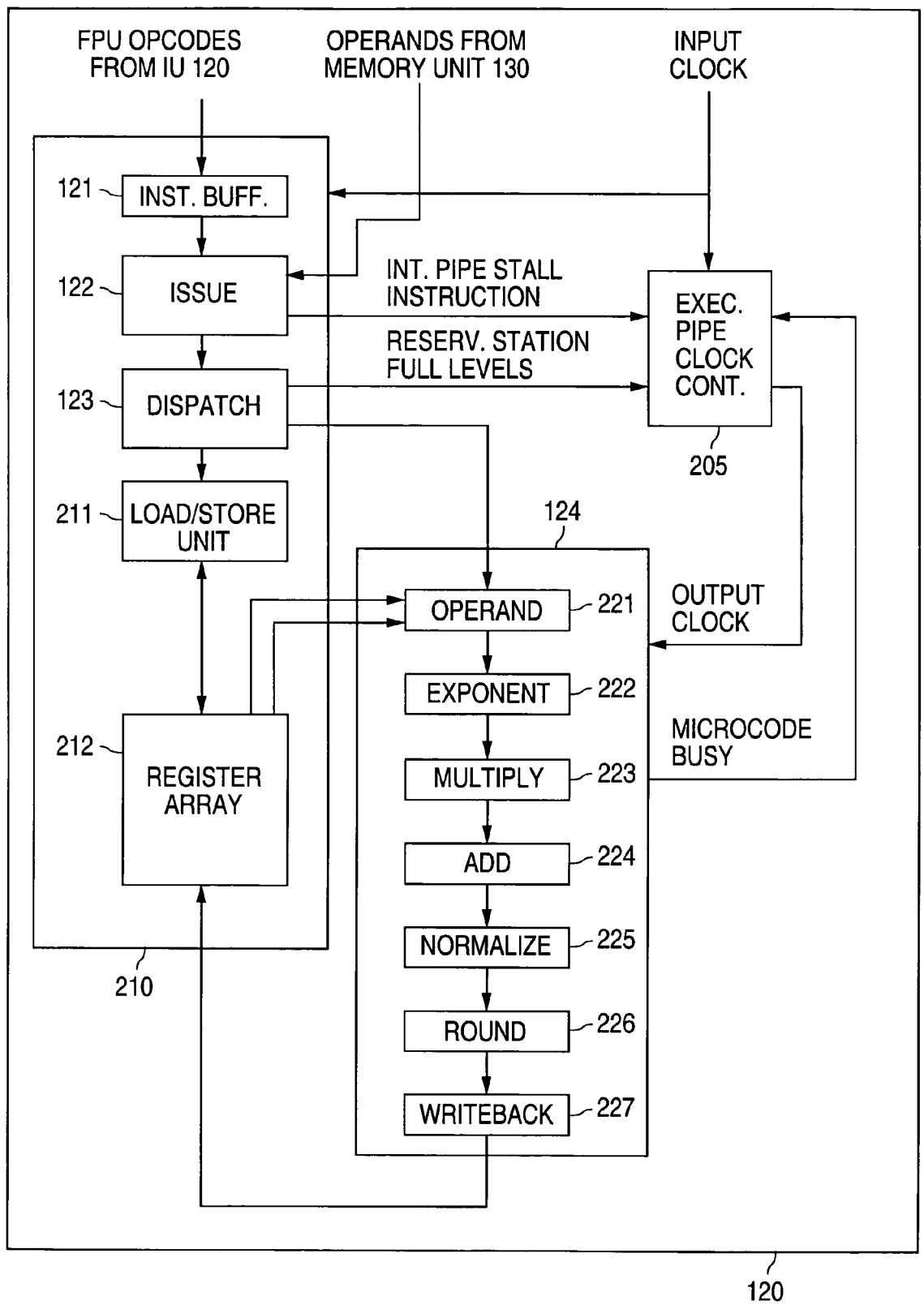
FIG. 2 illustrates the floating point unit in FIG. 1 in greater detail according to one embodiment of the present invention.

FIG. 2 illustrates floating point unit 120 in greater detail according to one embodiment of the present invention. Circuit block 210 generally designates components of floating point unit 120 that operate at the full speed of the Input Clock signal. These components include instruction buffer 121, issue unit 122, dispatch unit 123, load/store unit 211, and register array 212. However, the clock speed of floating point unit (FPU) execution pipeline 124 is variable and is controlled by execution pipeline clock controller 205. The Output Clock signal from execution pipeline clock controller 205 is a variable percentage (up to 100%) of the Input Clock signal. Execution pipeline clock controller 205 set the clock speed of FPU execution pipeline 124 as a function of the Reservation Station Full Levels status signals received from dispatch unit 123 and an Integer Pipe Stall Instruction signal received from issue unit 122.

FPU execution pipeline 124 comprises operand stage 221, which retrieves operands from register array 212 and receives FPU opcodes and operands from dispatch unit 123. FPU execution pipeline 124 further comprises exponent align stage 222, multiply stage 223, add stage 224, normalize stage 225, and round stage 226. Finally, FPU execution pipeline 124 comprises writeback stage 227, which writes results back to register array 212, or to data cache 132.

The architecture of FPU execution pipeline 124 illustrated and described above with respect to FIG. 2 is well known to those skilled in the art and need not be discussed in greater detail. This conventional architecture is merely illustrative of one exemplary type of FPU execution pipeline which may be clocked at variable speeds according to the principles of the present invention. The descriptions herein of variable speed FPU execution pipeline 124 should not be construed so as to limit the scope of the present invention.

Figure 3:
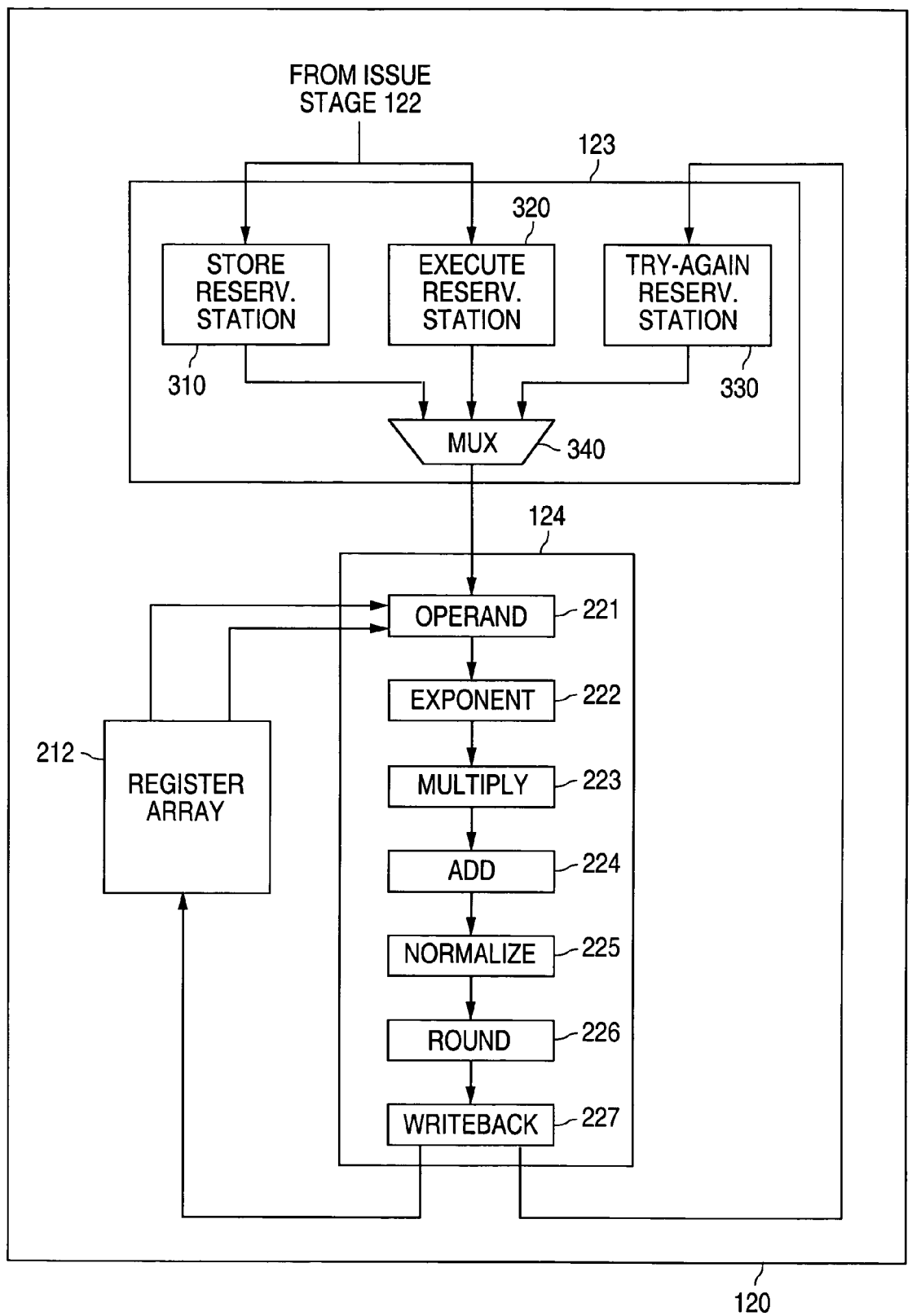
FIG. 3 illustrates the dispatch unit of the floating point unit according to one embodiment of the present invention.

FIG. 3 illustrates dispatch unit 123 of variable speed floating point unit (FPR) 120 according to one embodiment of the present invention. Dispatch unit 123 comprises a plurality of command and data queues that transfer opcodes and operands into FPU execution pipeline 124 via multiplexer (MUX) 340. These command and data queues include exemplary store reservation station 310, execute reservation station 320, and try-again reservation station 330, among others.

As will be discussed below in greater detail, denormal results that occur in FPU execution pipeline 124 are handled by try-again reservation station 330. In accordance with the principles of the present invention, when a denormal result is detected in normalize stage 225, round stage 226 is bypassed (disabled) and writeback stage 227 writes the denormal result into a register file in register array 212. The denormal result is flagged so that subsequent floating point operations do not use the denormal result. Writeback stage 227 also writes a special-purpose denormal result instruction into try-again reservation station 330. This special purpose denormal result instruction is subsequently reloaded into FPU execution pipeline 124. The denormal result instruction retrieves the denormal result from register array 212 and correctly processes and the denormal result the second time through by reusing existing shift registers and other existing hardware in multiply stage 223 and/or other stages of FPU execution pipeline 124.

Figure 4:
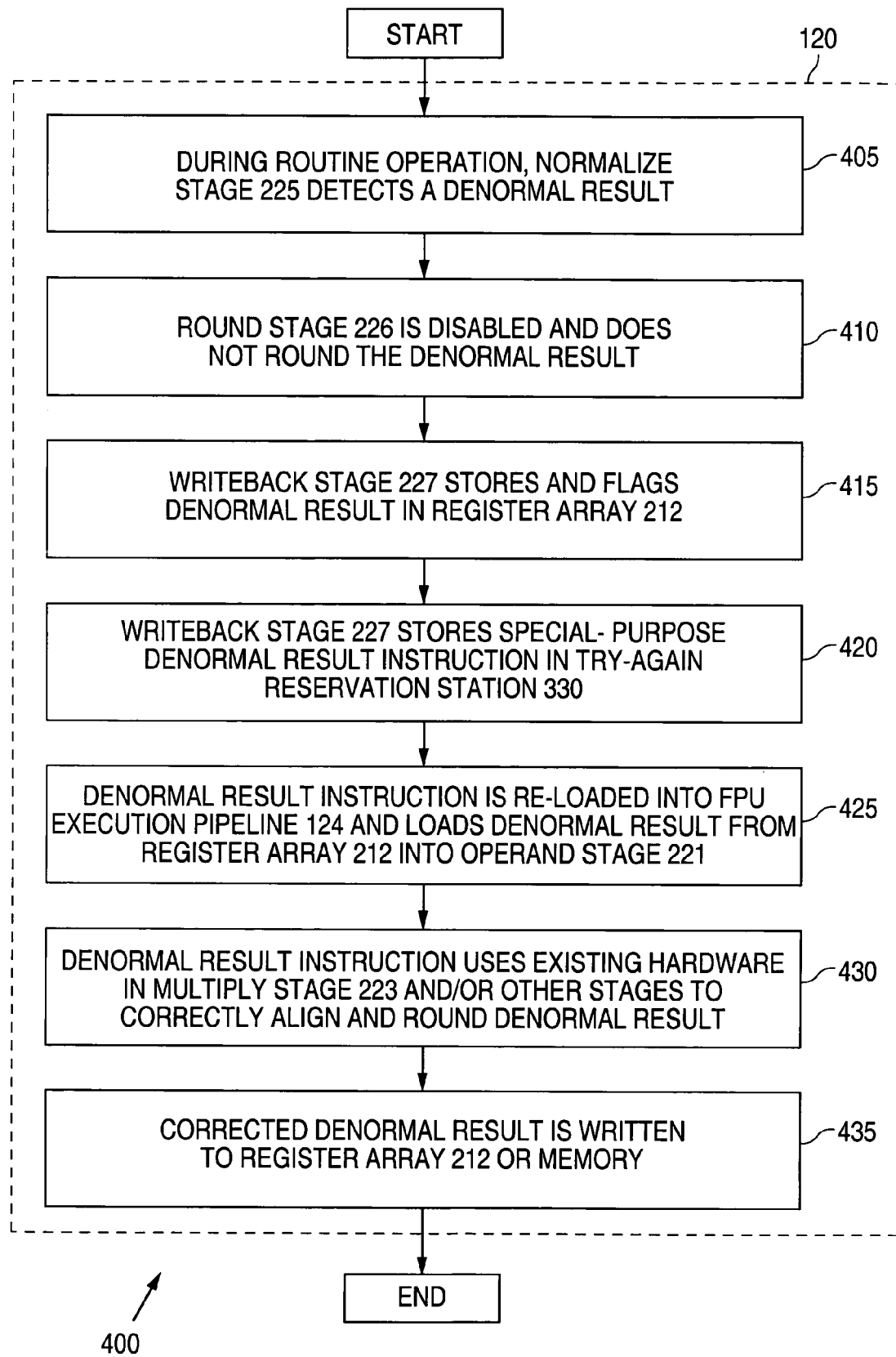
FIG. 4 is a flow chart illustrating the handling of a denormal result using the try-gain reservation station in the floating point unit according to one embodiment of the present invention.

FIG. 4 depicts flow chart 400, which illustrates the handling of a denormal result using try-gain reservation station 330 in floating point unit 129 according to one embodiment of the present invention. During routine operation, normalize stage 225 may detect a denormal result from add stage 224 (process step 405). In response, round stage 226 is disabled and does not round the denormal result (process step 410). Writeback stage 227 then stores the incomplete denormal result in register array 212 and sets a flag to indicate to subsequent floating point operations that the value is an incomplete denormal result (process step 415).

Writeback stage 227 also stores a special-purpose denormal result instruction in try-again reservation station 330 (process step 420). At a subsequent point in time when FPU execution pipeline 124 is available, the denormal result instruction is re-loaded into FPU execution pipeline 124. The denormal result instruction then loads the incomplete denormal result from register array 212 back into operand stage 221 (process step 425). As the incomplete denormal result continues to propagate through subsequent stages in FPU execution pipeline 124, the denormal result instruction causes the existing hardware in multiply stage 223, add stage 224 and/or other stages to correctly align and round the incomplete denormal result (process step 430). The corrected and completed denormal result is then written to register array 212 or memory (process step 435).

Although the present invention has been described with several embodiments, various changes and modifications may be suggested to one skilled in the art. It is intended that the present invention encompass such changes and modifications as fall within the scope of the appended claims.

What is claimed is:

1. A floating point unit comprising:
   an execution pipeline comprising a plurality of execution stages capable of executing floating point operations in a series of sequential steps; and
   a reservation station capable of storing a plurality of instructions to be loaded into said execution pipeline, where detection of a denormal result in said execution pipeline causes said execution pipeline to;
   store said denormal result in a register array associated with said floating point unit;
   store a denormal result instruction in said reservation station; and
   disable a round stage in said execution pipeline so that said denormal result is stored in said register array without rounding.

2. The floating point unit as set forth in claim 1 wherein said reservation station subsequently loads said denormal result instruction into said execution pipeline.

3. The floating point unit as set forth in claim 2 wherein said denormal result instruction causes said execution pipeline to retrieve said denormal result from said register array.

4. The floating point unit as set forth in claim 3 wherein said denormal result instruction causes said execution pipeline to complete processing of said retrieved denormal result.

5. The floating point unit as set forth in claim 4 wherein said execution pipeline completes processing of said retrieved denormal result using circuitry in a multiply stage of said execution pipeline.

6. The floating point unit as set forth in claim 4 wherein said execution pipeline completes processing of said retrieved denormal result using circuitry in an add stage of said execution pipeline.

7. The floating point unit as set forth in claim 1 wherein a writeback stage of said execution pipeline stores said denormal result instruction in said reservation station.

8. A data processor comprising;
   a memory unit for retrieving instructions and operands from memory, storing said retrieved instructions in an instruction cache and storing said retrieved operands in a data cache;
   an integer unit capable of retrieving instructions from said instruction cache and executing integer ons in an integer execution pipeline of said integer unit; and
   a floating point unit capable of receiving floating point opcodes from said integer unit, said floating point unit comprising:
      an execution pipeline comprising a plurality of execution stages capable of executing floating point operations in a series of sequential steps; and
      a reservation station capable of storing a plurality of instructions to be loaded into said execution pipeline, where detection of a denormal result in said execution pipeline causes said execution pipeline to store said denormal result in a register array associated with said floating point unit and causes said execution pipeline to store a denormal result instruction in said reservation station and to disable a round stage in said execution pipeline so that said denormal result is stored in said register array without rounding.

9. The data processor as set forth in claim 8 wherein said reservation station subsequently loads said denormal result instruction into said execution pipeline.

10. The data processor as set forth in claim 9 wherein said denormal result instruction causes said execution pipeline to retrieve said denormal result from said register array.

11. The data processor as set forth in claim 10 wherein said denormal result instruction causes said execution pipeline to complete processing of said retrieved denormal result.

12. The data processor as set forth in claim 11 wherein said execution pipeline completes processing of said retrieved denormal result using circuitry in a multiply stage of said execution pipeline.

13. The data processor as set forth in claim 11 wherein said execution pipeline completes processing of said retrieved denormal result using circuitry in an add stage of said execution pipeline.

14. The data processor as set forth in claim 8 wherein a writeback stage of said execution pipeline stores said denormal result instruction in said try-again reservation station.

15. A method of handling a denormal result in a floating point unit containing an execution pipeline comprising a plurality of execution stages capable of executing floating point operations in a series of sequential steps, the method comprising:
   detecting a denormal result in the execution pipelined-storing the denormal result in a register array associated with the floating point unit; and
   storing a denormal result instruction in a reservation station capable of storing a plurality of instructions to be loaded into the execution pipeline; and
   disabling in response to the detection of the denormal result, a round stage in the execution pipeline so that the denormal result is stored in the register array without rounding.

16. The method of handling a denormal result as set forth in claim 15 further comprising loading the denormal result instruction into the execution pipeline.

17. The method of handling a denormal result as set forth in claim 16 further comprising retrieving the denormal result from the register array into the execution pipeline.

18. The method of handling a denormal result as set forth in claim 17 further comprising processing the retrieved denormal result using circuitry in a multiply stage of the execution pipeline.

19. The method of handling a denormal result as set forth in claim 17 further comprising processing the retrieved denormal result using circuitry in an add stage of the execution pipeline.

* * * * *

UNITED STATES PATENT AND TRADEMARK OFFICE
CERTIFICATE OF CORRECTION

PATENT NO. : 6,976,153 B1
APPLICATION NO. : 10/254022
DATED : December 13, 2005
INVENTOR(S) : David Oliver et al.

It is certified that error appears in the above-identified patent and that said Letters Patent is hereby corrected as shown below:

Column 7, line 9: Please change "pipeline to;" to "pipeline to:"

Column 7, line 44: Please change "interger ons" to "integer instructions"

Column 8, line 38: Please change "disabling in response" to "disabling, in response"

Signed and Sealed this

Twenty-second Day of August, 2006

JON W. DUDAS
*Director of the United States Patent and Trademark Office*